United States Patent
Ahn et al.

(10) Patent No.: US 9,363,775 B2
(45) Date of Patent: Jun. 7, 2016

(54) METHOD OF CARRYING OUT SYNCHRONIZATION TRACKING AND A WIRELESS DEVICE USING THE SAME

(71) Applicant: LG ELECTRONICS INC., Seoul (KR)

(72) Inventors: Joonkui Ahn, Anyang-si (KR); Suckchel Yang, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 14/383,717

(22) PCT Filed: Mar. 8, 2013

(86) PCT No.: PCT/KR2013/001882
§ 371 (c)(1),
(2) Date: Sep. 8, 2014

(87) PCT Pub. No.: WO2013/133658
PCT Pub. Date: Sep. 12, 2013

(65) Prior Publication Data
US 2015/0030037 A1    Jan. 29, 2015

Related U.S. Application Data

(60) Provisional application No. 61/608,646, filed on Mar. 9, 2012, provisional application No. 61/611,589, filed on Mar. 16, 2012.

(51) Int. Cl.
*H04W 80/04*    (2009.01)
*H04W 56/00*    (2009.01)
*H04L 27/26*    (2006.01)

(52) U.S. Cl.
CPC ....... *H04W 56/0005* (2013.01); *H04L 27/2655* (2013.01); *H04L 27/2692* (2013.01); *H04W 56/0085* (2013.01)

(58) Field of Classification Search
CPC .. H04W 80/04; H04W 24/00; H04W 56/0005
See application file for complete search history.

(56) References Cited

U.S. PATENT DOCUMENTS

2013/0028269 A1*  1/2013  Limberg ............... H04L 1/0066
                                                                370/474
2013/0107808 A1*  5/2013  He ....................... H04W 56/001
                                                                370/328

(Continued)

FOREIGN PATENT DOCUMENTS

WO   WO 2011/115421  A2    9/2011
WO   WO 2011/153286  A1   12/2011

OTHER PUBLICATIONS

Mediatek Inc., "Tracking based on CRS and CSI-RS in additional carrier type", 3GPP TSG-RAN WG1 Meeting #68, R1-120621, Feb. 6-10, 2012, pp. 1-6.

(Continued)

*Primary Examiner* — Andrew Lee
(74) *Attorney, Agent, or Firm* — Birch, Stewart, Kolasch & Birch, LLP

(57) ABSTRACT

There are provided a method of carrying out synchronization tracking and a wireless device using the same. The wireless device receives CSI-RS (Channel Status Information-Reference Signal) setting for prescribing the CSI-RS from a base station, and TRS (Tracking Reference Signal) setting for prescribing the TRS from the base station. The wireless device tracks the synchronization based on the TRS.

11 Claims, 6 Drawing Sheets

(56) References Cited

U.S. PATENT DOCUMENTS

| | | | |
|---|---|---|---|
| 2013/0114535 A1* | 5/2013 | Ng | H04W 72/0446 370/329 |
| 2013/0223265 A1* | 8/2013 | Yomo | H04B 1/406 370/252 |
| 2013/0279437 A1* | 10/2013 | Ng | H04W 48/16 370/329 |
| 2014/0133589 A1* | 5/2014 | Ouchi | H04B 7/0689 375/260 |
| 2014/0133599 A1* | 5/2014 | Ouchi | H04B 7/10 375/295 |
| 2014/0226636 A1* | 8/2014 | Xu | H04W 72/042 370/336 |
| 2014/0314000 A1* | 10/2014 | Liu | H04L 5/0053 370/329 |
| 2015/0055632 A1* | 2/2015 | Gou | H04L 5/001 370/336 |

OTHER PUBLICATIONS

Motorola Mobility, "Reference and Synchronisation Signals in Additional Carrier Type", 3GPP TSG-RAN WG1 #68, R1-120515, Feb. 6-10, 2012, pp. 1-3.

Samsung, "Time and frequency synchronization on additional type carriers", 3GPP TSG RAN WG1 Meeting #67, R1-114220, Nov. 14-18, 2011, pp. 1-3.

\* cited by examiner

METHOD OF CARRYING OUT SYNCHRONIZATION TRACKING AND A WIRELESS DEVICE USING THE SAME

CROSS REFERENCE TO RELATED APPLICATIONS

This application is the National Phase of PCT International Application No. PCT/KR2013/001882 filed on Mar. 8, 2013, which claims priority under 35 U.S.C. 119(e) to U.S. Provisional Application Nos. 61/608,646 filed on Mar. 9, 2012 and 61/611,589 filed on Mar. 16, 2012. All of which are hereby expressly incorporated by reference into the present application.

BACKGROUND OF THE INVENTION

1. Field of the Invention

The present invention relates to wireless communication and, more particularly, to a method for carrying out synchronization tracking and a wireless device using the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

As disclosed in 3GPP TS 36.211 V8.7.0 (2009-May) "Evolved Universal Terrestrial Radio Access (E-UTRA); Physical Channels and Modulation (Release 8)", a physical channel in 3GPP LTE/LTE-A may be divided into PDSCH (Physical Downlink Shared Channel) and PDCCH (Physical Downlink Control Channel) being a downlink channel, and PUSCH (Physical Uplink Shared Channel) and PUCCH (Physical Uplink Control Channel) being an uplink channel.

Synchronization is a basic procedure for the communication between the BS and the terminal are the basic steps. In general, the terminal performs the initial synchronization through a synchronization signal. Next, the terminal performs synchronization tracking to maintain the synchronization. If the terminal does not maintain the synchronization longer, the terminal moves to another cell or declares wireless link failure.

An existing 3GPP LTE provides a cell-specific reference signal (CRS) for synchronization tracking. However, a following approach is discussed. Since the CRS is transmitted all sub-frames across the entire system bandwidth, the CRS is not transmitted or the CRS is transmitted with limited resources in order to reduce overhead.

SUMMARY OF THE INVENTION

The present invention provides a method for carrying out synchronization tracking and a wireless device using the same.

According to the embodiment of the present invention, there is provided a method of carrying out synchronization tracking in a wireless communication system. The method includes: receiving channel status information-reference signal (CSI-RS) configuration for prescribing the CSI-RS from a base station by a wireless device; receiving tracking reference signal (TRS) configuration for prescribing the TRS from the base station by the wireless device; receiving the CSI-RS according to the CSI-RS configuration by the wireless device; receiving the TRS according to the TRS configuration by the wireless device; and tracking the synchronization based on the TRS by the wireless device. The TRS configuration comprises information on whether an antenna port used according to the CSI-RS is used according to the TRS.

The TRS configuration may include information on whether the TRS is collaboratively used through a combination of the CRS-RS and the TRS.

The CSI-RS may be received through a first pair among a plurality of antenna port pairs, and the TRS may be received through one antenna port of a second pair among the plurality of antenna port pairs.

According to another embodiment of the present invention, there is provided a wireless device for carrying output synchronization tracking in a wireless communication system, the wireless device including: a radio frequency (RF) unit to transmit and receive a wireless signal; and a processor connected to the RF unit, wherein the processor receives channel status information-reference signal (CSI-RS) configuration for prescribing the CSI-RS from a base station by a wireless device, receives tracking reference signal (TRS) configuration for prescribing the TRS from the base station by the wireless device, receives the CSI-RS according to the CSI-RS configuration by the wireless device, receives the TRS according to the TRS configuration by the wireless device, and tracks the synchronization based on the TRS by the wireless device, wherein the TRS configuration comprises information on whether an antenna port used according to the CSI-RS is used according to the TRS.

A reference signal for the synchronization tracking may be prescribed using limited radio resources.

DESCRIPTION OF EXEMPLARY EMBODIMENTS

A wireless device may be fixed and may have mobility, and may be referred to as other terms such as user equipment (UE), MS (mobile station), UT (user terminal), SS (subscriber station), and MT (mobile terminal). In general, a base station (BS) refers to a fixed station communicating with the wireless device, and may be referred to as other terms such as eNB (evolved-NodeB), BTS (base transceiver system), and access point (AP).

The following description will be made where the present invention is applied based on 3GPP (3rd Generation Partnership Project) 3GPP LTE (long term evolution) or 3GPP LTE-A (LTE-Advanced). This is illustrative purpose only and the present invention is applicable to various wireless communication networks. Hereinafter, the LTE includes LTE and/or LTE-A.

Figure 1:
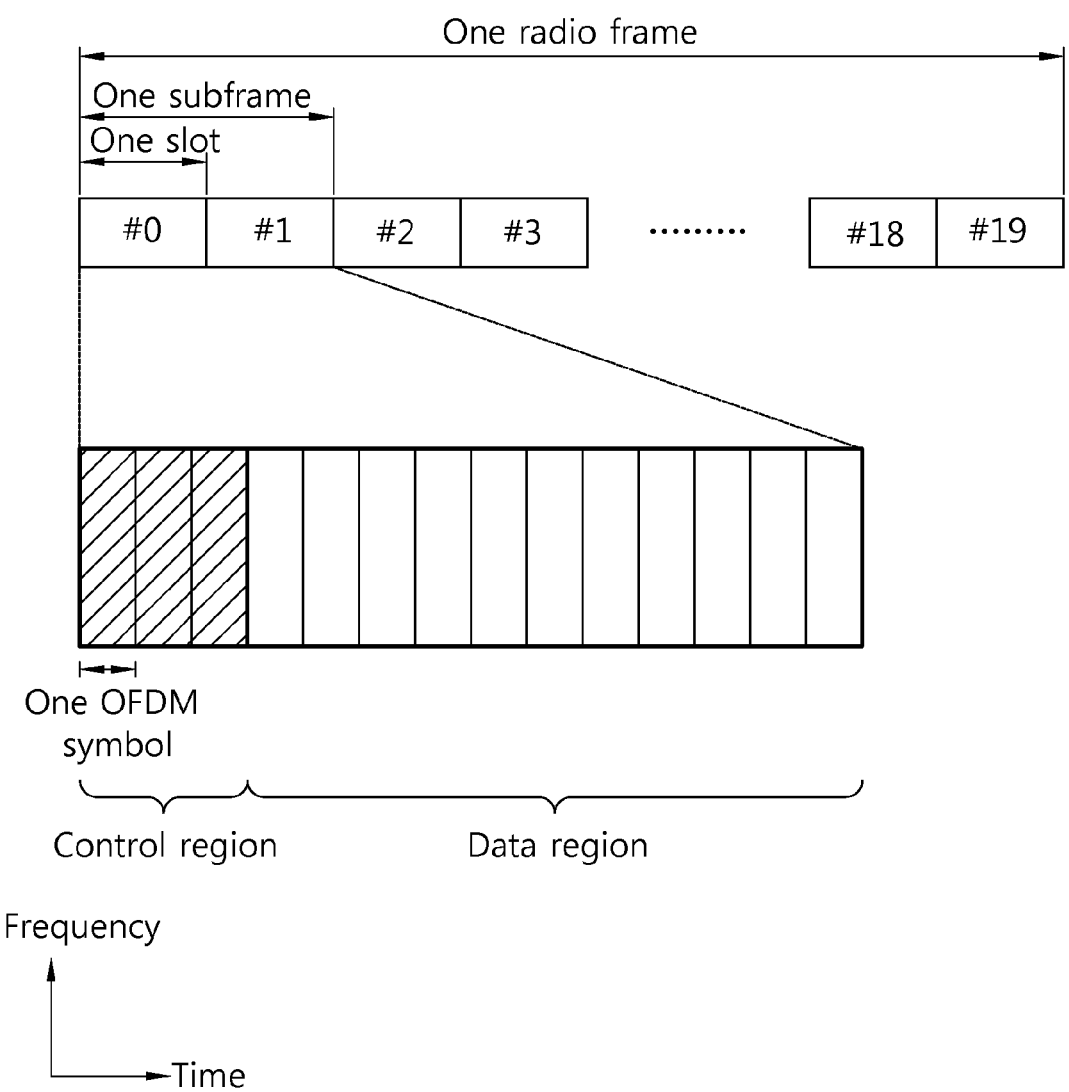
FIG. 1 illustrates a structure of a radio frame in a 3GPP LTE.

FIG. 1 illustrates a structure of a radio frame in a 3GPP LTE. This may refer to a third section of 3GPP (3rd Generation Partnership Project) TS 36.211 V10.3.0 (2011-September) "Technical Specification Group Radio Access Network; Evolved Universal Terrestrial Radio Access (E-UTRA); Physical channels and modulation (Release 10)".

The radio frame includes ten sub-frames marked with indexes 0~9. One sub-frame includes two continuous slots. A time required to transmit one sub-frame refers to a transmission time interval (TTI). For example, a length of one sub-frame may be 1 ms and a length of one slot may be 0.5 ms.

The one slot includes a plurality of orthogonal frequency division multiplexing (OFDM) symbols at a time domain. Since the 3GPP LTE uses an OFDMA at downlink, the OFDM symbol is used to represent one symbol period in time domain only, and the embodiment is not limited to a multiple access scheme or name. For example, the OFDM symbol may be called other names such as a SC-FDMA (single carrier-frequency division multiple access) symbol and a symbol interval.

Although one slot includes 7 OFDM symbols which is illustrative purpose only, the number of OFDM symbols included in one slot may be changed depending on the length of a CP (Cyclic Prefix). According to 3GPP TS 36.211 V8.7.0, one slot in the regular CP includes 7 OFDM symbols, and one slot in an extended CP includes 6 OFDM symbols.

A resource block (RB) includes a plurality of sub-frames in one slot as a resource allocation unit. For example, if one slot includes 7 OFDM symbols in a time domain, the RB includes 12 sub-carriers in a frequency domain, one RB may include 84 (7×12) resource elements (REs).

The downlink (DL) sub-frame is divided into a control region and a data region at the time domain. The control region includes maximum three OFDM symbols prior to a first slot in the sub-frame, but the number of OFDM symbols included in the control region may be changed. A Physical Downlink Control Channel (PDCCH) and another control channel are allocated to the control region, and a PDSCH is allocated to the data region.

As disclosed in 3GPP TS 36.211 V8.7.0, a physical channel in 3GPP LTE may be divided into PDSCH (Physical Downlink Shared Channel) and PUSCH (Physical Uplink Shared Channel) being a data channel and PDCCH (Physical Downlink Control Channel), PCFICH (Physical Control Format Indicator Channel), PHICH (Physical Hybrid-ARQ Indicator Channel) and PUCCH (Physical Uplink Control Channel) being a control channel.

A PCFICH transmitted from a first OFDM symbol of the sub-frame carries a control format indicator (CFI) regarding the number of OFDM symbols (that is, size of the control region) used to transmit control channels in the sub-frame. The terminal receives the CFI on the PCFICH to monitor the PDCCH.

Unlike the PDCCH, the PCFICH is transmitted through a fixed PCFICH resource of the sub-frame without using blind decoding.

The PHICH carries positive-acknowledgement (ACK)/negative-acknowledgement (NACK) signal for a downlink hybrid automatic repeat request (HARQ). An ACK/NACK signal with respect to UL data over the PUSCH transmitted by the terminal is transmitted over the PHICH.

A Physical Broadcast Channel (PBCH) is transmitted from four OFDM symbols prior to a second slot of the first sub-frame of the radio frame. The PHCH carries essential system information to communicate with the base station. The system information transmitted through the PBCH refers to a master information block (MIB). In comparison with this, system information transmitted over the PDSCH indicated by the PDCCH refers to a system information block (SIB).

Control information transmitted through the PDCCH refers to downlink control information (DCI). The DCI may include resource allocation of the PDSCH (refers to a downlink (DL) grant), resource allocation of the PUSCH (refers to uplink (UL) grant), and a set of a transmission power control command and activation of a Voice over Internet Protocol (VoIP) with respect to separate UEs in a predetermined UE group.

The blind decoding is a scheme which demasks a desired identifier to a CRC of a received PDCCH (refers to candidate PDCCH), and checks CRC error to confirm whether a corresponding PDCCH is an own control channel.

The base station determines a PDCCH format according to a DCI to be sent to the terminal to attach a Cyclic Redundancy Check (CRC) to the DCI, and masks a unique identifier (refers to a Radio Network Temporary Identifier (RNTI)) to the CRC according to an owner or application of the PDCCH.

The control region in the sub-frame includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements. A format of the PDCCH and the possible bit number of the PDCCH are determined according to the relationship between the number of the CCEs and a coding rate provided to the CCEs.

One REG includes four REs and one CCE include nine REGs. In order to configure one PDCCH, $\{1, 2, 4, 8\}$ CCEs may be used, and an element of each of the $\{1, 2, 4, 8\}$ CCEs refers to a CCE aggregation level.

The base station determines the number of the CCEs to transmit the PDCCH according to a channel state. For example, one CCE is used in a terminal having an excellent downlink channel state to transmit the PDCCH. Eight CCEs are used in the terminal having a poor downlink channel state to transmit the PDCCH.

Interleaving of an REG unit for a control channel including one or more CCEs is performed, Cell ID (identifier) based on the cyclic shift (cyclic shift) is performed, and is mapped to a physical resource.

According to the 3GPP TS 36.211 V8.7.0, an uplink channel includes a PUSCH, a PUCCH, a Sounding Reference Signal (SRS), and a Physical Random Access Channel (PRACH).

The PUCCH supports a multiple format. A PUCCH having the different bit number per sub-frame may be used according to a modulation scheme depending on a PUCCH format. A PUCCH format 1 is used to transmit a Scheduling Request (SR), a PUCCH format 1a/1b is used to transmit ACK/NACK for a HARQ, a PUCCH format 2 is used to transmit a CQI, and a PUCCH format 2a/2b is used for simultaneous transmission of the CQI the ACK/NACK. When only the ACK/NACK is transmitted from the sub-frame, the PUCCH format 1a/1b is used. When only an SR is transmitted, the PUCCH format 1 is used. When the SR and the ACK/NACK are simultaneously transmitted, the PUCCH format 1 is used. The ACK/NACK signal is modulated to a resource allocated to the SR and is transmitted.

Figure 2:
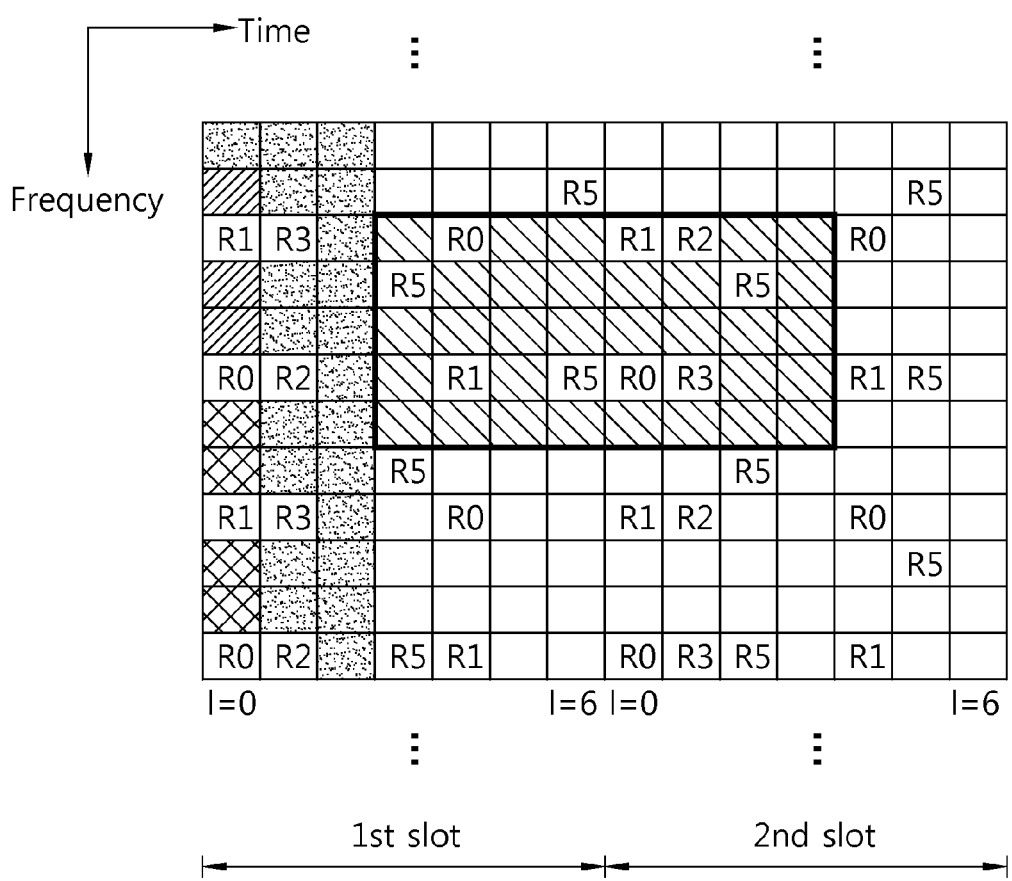
FIG. 2 illustrates an example where a reference signal and a control channel are arranged in a DL sub-frame of the 3GPP LTE.

FIG. 2 illustrates an example where a reference signal and a control channel are arranged in a DL sub-frame of the 3GPP LTE.

The control region (or the PDCCH region) includes prior three OFDM symbols, and a data region to which the PDSCH is transmitted includes remaining OFDM symbols.

The PCFICH, the PHICH and/or the PDCCH are transmitted into the control region. A CFI of the PCFICH represents three OFDM symbols. A region except for a resource to which the PCFICH and/or the PHICH is transmitted in the control region becomes a PDCCH region to monitor the PDCCH.

Further, various reference signals are transmitted to the sub-frame.

All wireless devices in a cell may receive a cell-specific reference signal (CRS) and the CRS is transmitted through the entire downlink band. In FIG. 2, 'R0' represents a resource element (RE) to which a CRS with respect to a first antenna port is transmitted, 'R1' represents an RE to which a CRS with respect to a second antenna port is transmitted, 'R2' represents an RE to which a CRS with respect to a third antenna port is transmitted, and 'R3' represents an RE to which a CRS with respect to a fourth antenna port is transmitted.

A RS sequence $r_{l,ns}(m)$ for the CRS is defined by a following equation 1.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

In equation 1, the $m=0, 1, \ldots, 2N_{maxRB}-1$, the $N_{maxRB}$ represents the maximum number of the RB, the ns represents a slot number in a radio frame, and the 1 represents an OFDM symbol number in a slot.

The pseudo-random sequence c(i) is defined by a Gold sequence of a length 31 as expressed by the following equation 2.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 2]}$$

In the equation 2, the Nc=1600, and a first m-sequence is initialized as $x_1(0)=1$, $x_1(n)=0$, $m=1, 2, \ldots, 30$.

A second m-sequence is initialized as $c_{init}=2^{10}(7(ns+1)+l+1)(2N^{cell}_{ID}+1)+(2N^{cell}_{ID}+N_{CP}$ at start of each OFDM symbol. The $N^{cell}_{ID}$ represents a physical cell identity (PCI) of a cell, the $N_{CP}=1$ in a regular CP, and $N_{CP}=0$ in an extension CP.

A UE-specific Reference Signal (URS) is transmitted to the sub-frame. The CRS is transmitted from the entire region of the sub-frame, but the URS is transmitted in a data region of the sub-frame and is used to demodulate the corresponding PDSCH. In FIG. 2, 'R5' represents an RE to which the URS is transmitted. The URS refers to a dedicated Reference Signal (DRS) or a Demodulation Reference Signal (DM-RS).

The URS is transmitted to only an RB to which the PDSCH is mapped. FIG. 2 illustrates R5 except for a region to which the PDSCH is transmitted to represent a location of an RE to which the URS is mapped.

Only a wireless device for receiving a corresponding PDSCH uses the URS. An RS sequence $r_{ns}(m)$ for the URS is expressed by the above equation 1. In this case, $m=0, 1, \ldots, 12N_{PDSCH,RB}-1$, and the $N_{PDSCH,RB}$ represents the RB number of corresponding PDSCH transmissions. A pseudo-random sequence generator is initialized as $c_{init}=(\text{floor}(ns/2)+1)(2N^{cell}_{ID}+1)2^{16}+n_{RNTI}$ at start of each sub-frame. The $n_{RNTI}$ represents an identifier of the wireless device.

The above is a case where the URS is transmitted through a single antenna. When the URS is transmitted through a multiple antenna, the pseudo-random sequence generator is) initialized as $c_{init}=(\text{floor}(ns/2)+1)(2N^{cell}_{ID}+1)2^{16}+n_{SCID}$ at start of each sub-frame. The $n_{SCID}$ represents a parameter obtained from a DL grant (for example, DCI format 2B or 2C) associated with PDSCH transmission.

Figure 3:
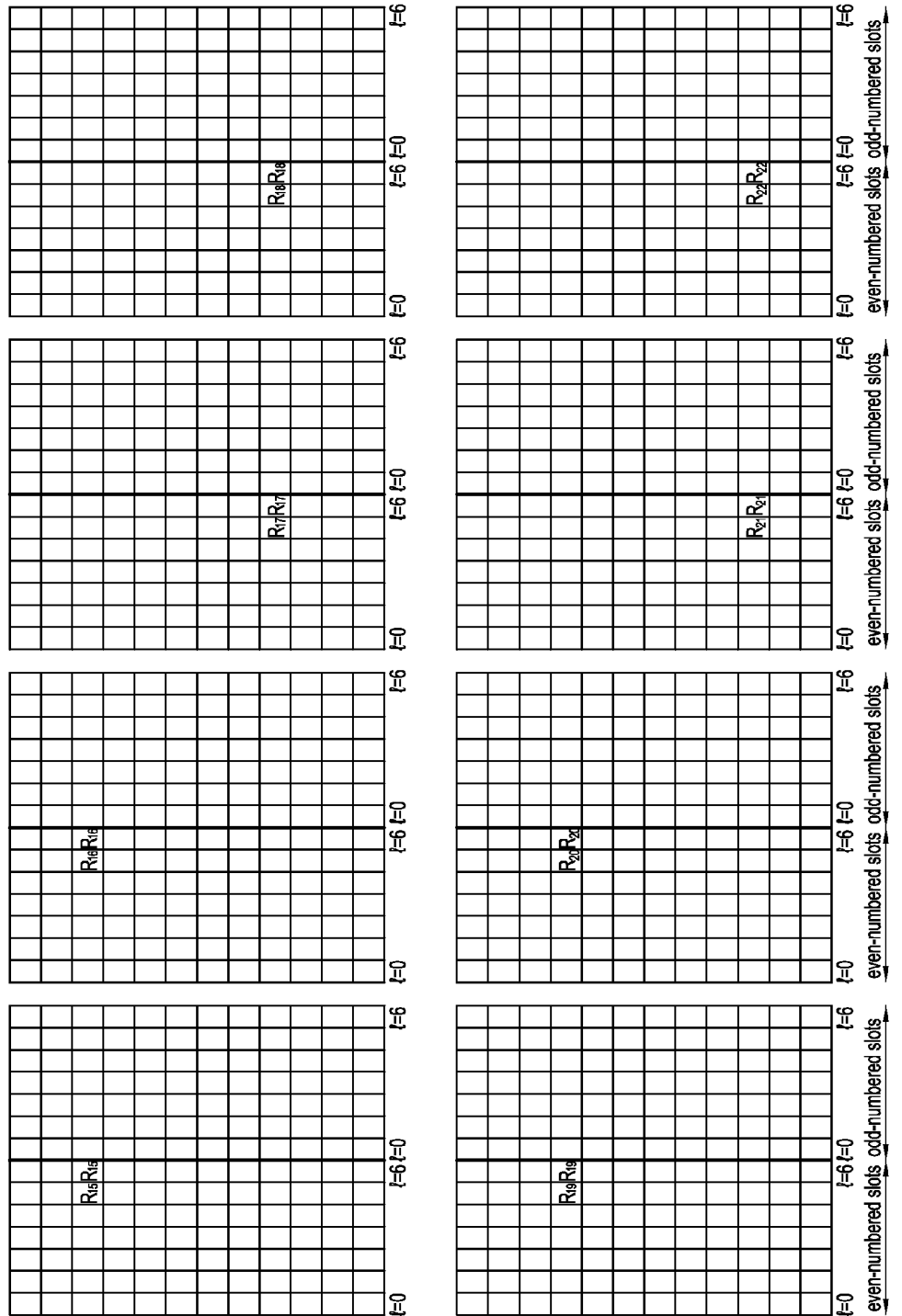
FIG. 3 illustrates an example of CSI-RS mapping.

FIG. 3 illustrates an example of CSI-RS mapping.

In order to estimate a channel state, a channel status information-reference signal (CSI-RS) is defined separately from the CRS. Unlike the CRS, the CSI-RS has maximum 32 different configurations in order to reduce inter-cell interference in a multi-cell environment.

The CSI-RS configuration is different depending on the number of antenna ports in the cell and maximum different configurations are possible between adjacent cells. The CSI-RSs are classified according to the type of CP. Both of a frame structure type 1 and a frame structure type 2 are applied or only the frame structure type 2 is applied according to the frame structure type (frame structure type 1 FDD, Frame structure type 2 TDD).

The CSI-RS supports maximum 8 antenna ports. The CSI-RS supports the antenna port p of {15}, {15, 16}, {15, 16, 17, 18}, {15, . . . , 22}. That is, The CSI-RS supports 1, 2, 4, 8 antenna ports.

A RS sequence $r_{ns}(m)$ for the CSI-RS is expressed by the above equation 1. In this case, the pseudo-random sequence generator is initialized as $c_{init}=2^{10}(7(ns+1)+l+1)(2N^{csi}_{ID}+1)+2N^{csi}_{ID}+N_{CP}$ at start of each sub-frame. If the $N^{csi}_{ID}$ is not separately prescribed, the $N^{csi}_{ID}$ is equal to $N^{cell}_{ID}$. $N_{CP}=1$ in a regular CP, and $N_{CP}=0$ in an extension CP.

In the sub-frames prescribed so that the CSI-RS is transmitted, a reference signal sequence $r_{ns}(m)$ is mapped to a complex value modulation symbol $a_{k,l}^{(p)}$ used as a reference symbol with respect to an antenna port p by a following equation 3.

$$a_{k,l}^{(p)} = W_{l''} \cdot r_{l,n_s}(m') \quad \text{[Equation 3]}$$

where $$k = k' + 12m + \begin{cases} -0 & \text{for } p \in \{15, 16\}, \text{ normal } CP \\ -6 & \text{for } p \in \{17, 18\}, \text{ normal } CP \\ -1 & \text{for } p \in \{19, 20\}, \text{ normal } CP \\ -7 & \text{for } p \in \{21, 22\}, \text{ normal } CP \\ -0 & \text{for } p \in \{15, 16\}, \text{ extended } CP \\ -3 & \text{for } p \in \{17, 18\}, \text{ extended } CP \\ -6 & \text{for } p \in \{19, 20\}, \text{ extended } CP \\ -9 & \text{for } p \in \{21, 22\}, \text{ extended } CP \end{cases}$$

$$l = l' + \begin{cases} l'' & CSI\text{-}RS \text{ configurations } 0\text{-}19, \text{ normal } CP \\ 2l'' & CSI\text{-}RS \text{ configurations } 20\text{-}31, \text{ normal } CP \\ l'' & CSI\text{-}RS \text{ configurations } 0\text{-}27, \text{ extended } CP \end{cases}$$

$$W_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1 \ldots, N_{RB}^{DL} - 1$$

$$m' = m + \left\lfloor \frac{N_{RB}^{max,DL} - N_{RB}^{DL}}{2} \right\rfloor$$

In the equation 3, the (k', l') and the ns may be obtained by a following table 1. The CSI-RS may be transmitted in a downlink slot where (ns mod 2) satisfies conditions of the following table 1.

A following table 1 indicates an example of CSI-RS configuration with respect to a normal CP.

TABLE 1

| CSI-RS configu-ration | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

A sub-frame including the CSI-RS satisfies a following equation 4.

$$10n_f + \lfloor n_s/2 \rfloor - \Delta_{CSI-RS} \bmod T_{CSI-RS} = 0 \quad \text{Equation [4]}$$

In the equation 4, the nf represents a system frame number, and the $\Delta_{CSI-RS}$ and the $T_{CSI-RS}$ are expressed by a following table 2 according to CSI-RS sub-frame configuration.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

The 'CSI-RS-SubframeConfig' $I_{CSI-RS}$ is given by an upper layer and represents CSI-RS sub-frame configuration. The $T_{CSI-RS}$ represents a cell-specific sub-frame configuration period, and the $\Delta_{CSI-RS}$ represents a cell-specific sub-frame offset. The CSI-RS supports 5 different duty cycles according to CSI feedback, and may be transmitted to have different sub-frame offsets at each cell.

In an example of FIG. 3, the CSI-RS is transmitted using the same two continuous resource elements with respect to two antenna ports, for example, p={15, 16}, {17, 18}, {19, 20}, {21, 22}, particularly, using an orthogonal cover code (OCC). Each CSI-RS is allocated in a wireless resource region to have a specific pattern according to CSI-RS configuration. Due to the above meaning, the wireless resource configuration for the CSI-RS in a corresponding antenna port refers to a CSI-RS pattern.

A resource element (k,l) used to transmit the CSI-RS with respect to a predetermined antenna port of a set S is not used to transmit the PDSCH with respect to a predetermined antenna port in the same slot. Further, the resource element (k,l) is not used to transmit the CSI-RS with respect to another predetermined antenna port except for the set S. In this case, antenna ports included in the set S includes {15, 16}, {17, 18}, {19, 20}, and {21, 22}.

Hereinafter, a discontinuous reception (DRX) in the 3GPP LTE will be described.

The DRX is a scheme to reduce power consumption of the wireless device so that the terminal discontinuously monitors a downlink channel.

Figure 4:
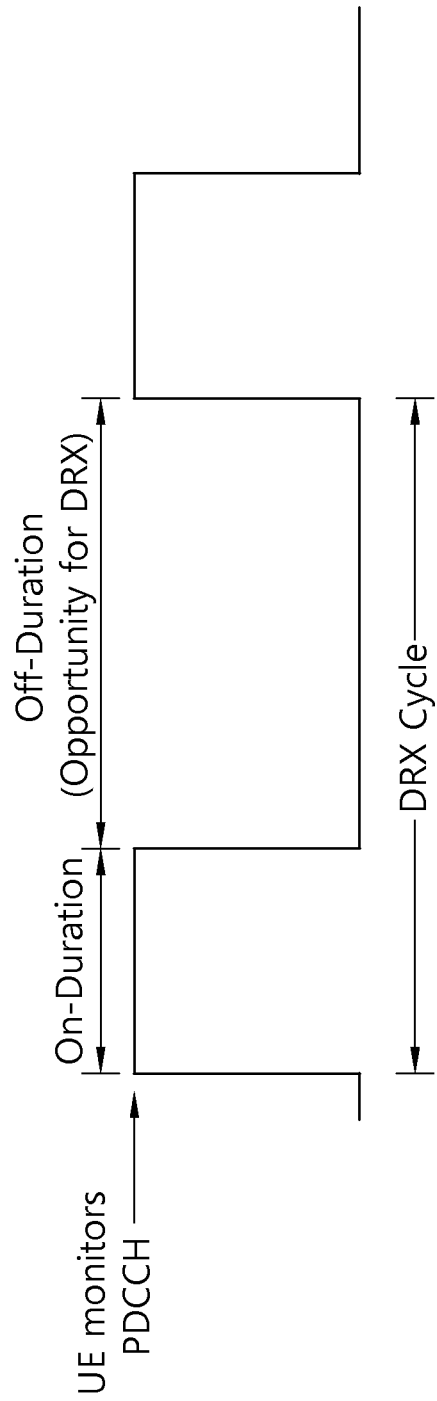
FIG. 4 illustrates an example of a DRX cycle.

FIG. 4 illustrates an example of a DRX cycle.

A DRX cycle specifies the periodic repetition of the on-duration followed by a possible period of inactivity. The DRX cycle includes an on-duration and an off-duration. The on-duration is duration when the terminal monitors the PDCCH in the DRX cycle.

If the DRX cycle is prescribed, the terminal may monitor the PDCCH during only the on-duration but may not monitor the PDCCH during the off-duration.

An onDuration timer is used to define the on-duration. The on-duration may be defined as an active duration of the onDuration timer. A PDCCH-sub-frame represents a sub-frame where the PDCCH (or generally control channel) is monitored.

A monitored duration of the control channel may be defined in addition to the DRX cycle. The monitored duration of the control channel is defined an active time. The active time may include the on-duration to periodically monitor the PDCCH and a duration to monitor the PDCCH due to generation of an event.

A drx-Inactivity timer deactivates the DRX. If the drx-Inactivity timer in the active state, the terminal continuously monitors the PDCCH regardless of a DRX cycle. If an initial UL grant or DL grant is received on the PDCCH, the drx-Inactivity Timer starts.

Hereinafter, synchronization tracking according to the embodiment is described.

An existing 3GPP LTE/LTE-A based wireless communication system transmits a reference signal, a sync signal, and a control channel through a DL carrier. The DL carrier based on the 3GPP LTE/LTE-A refers to a legacy carrier.

However, the next generation wireless communication system has introduced a new carrier in order to attenuate interference between a plurality of serving cells and to improve extension of a carrier. The new carrier refers to an extension carrier or a new carrier type (NCT). A cell based on the extension carrier refers to an extension call.

A CRS in the legacy carrier is transmitted in all DL sub-frames through the entire system band. In comparison with this, the CRS in the NCT is not transmitted or is transmitted in a specific DL sub-frame through a part of the system band.

The PDCCH in the legacy carrier is demodulated based on the CRS, but the PDCCH in the NCT may not be transmitted. The CRS in the legacy carrier is used for data demodulation, but only a URS (and/or terminal-specific RS) is used in the data demodulation in the NCT.

The legacy carrier may be prescribed to a primary cell or a secondary cell, but the extension cell may be prescribed to only the secondary cell.

In particular, since the CRS is not transmitted in the NCT or is restrictively transmitted, the wireless device may have a difficulty in performing frequency/time synchronization tracking based on the CRS.

The embodiment suggests a tracking RS (hereinafter referred to as 'TRS') using a structure of a CRS-RS for synchronization tracking. The TRS may refer to a tracking CSI-RS (T-CSI-RS).

An existing CSI-RS is transmitted in one slot of one sub-frame, and may be insufficient by only a signal used to maintain the synchronization using only 2 REs per RB with respect to each antenna port. Further, according to existing configuration, a transmitted minimum period of the CSI-RS is a 5 sub-frames only. That is, the CSI-RS is transmitted in at least 5 sub-frame periods, but the CSI-RS may not be transmitted in 2 to 4 sub-frame periods.

Figure 5:
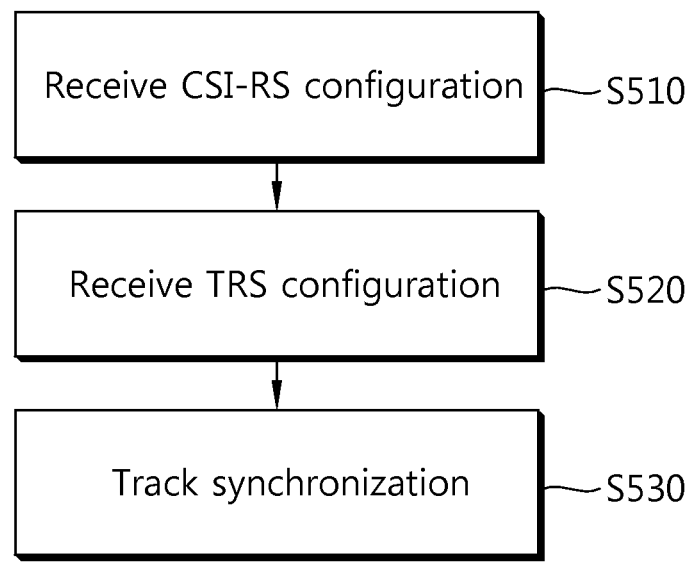
FIG. 5 is a flowchart illustrating a method of carrying out synchronization tracking according to according to an embodiment of the present invention.

FIG. 5 is a flowchart illustrating a method of carrying out synchronization tracking according to according to an embodiment of the present invention.

In step S510, a wireless device receives CSI-RS configuration from a base station. As shown in FIG. 3, CSI-RS may be prescribed. If the CSI-RS is not used, the wireless device may not receive the CSI-RS configuration.

In step S520, the wireless device receives the TRS configuration from the base station. The TRS configuration may be received through an RRC message or a broadcasting message.

In step S530, the wireless device receives the TRS according to the TRS configuration, and tracks synchronization based on the received TRS. The wireless device may perform initial downlink synchronization through a synchronization signal before receiving the CSI-RS configuration and/or the TRS configuration. The TRS is used for the synchronization tracking to maintain downlink synchronization.

The TRS configuration may include information to determine a transmitted TRS pattern of the TRS. The TRS pattern may be determined based on the CSI-RS pattern. The TRS pattern may include a period and a position of a sub-frame to which the TRS is transmitted and/or a position in a frequency/time domain in the sub-frame. The TRS configuration may be additionally defined in the CSI-RS configuration of the table 1.

The TRS configuration may include information on an antenna port for the TRS. The CSI-RS is transmitted using a pattern corresponding to at least one antenna port among patterns defined for 8 antenna ports. A transmitted antenna port of the TRS may be defined as at least one of the 8 antenna ports. A transmitted antenna port of the TRS may not use the CSI-RS.

An antenna port for the TRS may be determined based on a synchronization signal or a cell ID.

CSI-RSs in the 8 antenna ports are transmitted in a Code Division Multiplexing (CDM) form in a state that two CSI-RSs form a pair. That is, each antenna port pair of (15, 16), (17, 18), (19, 20), (21, 22) is multiplexed according to an orthogonal code in the same two REs of one RB. When a phase difference with respect to two REs is obtained, the CDM may not separate two antenna ports which are code-division-multiplexed. Accordingly, it is suggested that CDM for the TRS is not performed. For example, an antenna port for the TRS may be designated as one of antenna ports 15, 17, 19, and 21 or may be designated as one of antenna ports 16, 18, 20, and 22.

The TRS pattern may be prescribed independently from the CSI-RS pattern. For example, the TRS is used in one antenna port (for example, CSI-RS antenna port 15). The TRS pattern may include at least one of CSI-RS patterns defined as antenna ports 15 to 22. The base station may report whether the TRS is transmitted through the same antenna port as the CSI-RS to the wireless device. The base station may report information on whether an antenna port used according to the CSI-RS is used according to the TRS to the wireless device. Alternatively, the base station may report whether the TRS may be collaboratively used through a combination of the CSI-RS and the TRS to the wireless device. The information may be included in the TRS configuration. The wireless device may collaboratively use the information in the synchronization tracking through the combination of the CSI-RS and the IRS.

The TRS may be transmitted through the same antenna port (for example, CRS antenna port 0) as that of the CRS. The base station may report whether the TRS is transmitted through the same antenna port as that of the CRS or the TRS may be collaboratively used through a combination of the CRS and a T-CSI-RS to the wireless device. Accordingly, the wireless device may collaboratively use the TRS in the synchronization tracking through the combination of the CSI-RS and the CRS.

In one sub-frame, the TRS may be transmitted in only a first slot or only a second slot. If the TRS is transmitted in only the second slot, collision between the TRS and the CSI-RS may be prevented. The TRS may be used in the synchronization in cooperation with the CSI-RS transmitted in the first slot.

An RS sequence $r_{n_s}(m)$ for the TRS may be expressed by the above equation 1. However, the m=0, 1, . . . , $2N_{TRSRB}-1$, and the $N_{TRSRB}$ represents the number of RBs used to transmit the TRS. A pseudo-random sequence generator may be initialized as $c_{init}=2^{10}(7(ns_{TRS}+1)+l_{TRS}+1)(2N^{TRS}_{ID}+1)+2N^{TRS}_{ID}+N_{CP}$ at start of each OFDM symbol. The $ns_{TRS}$ is equal to ns or is a separately defined parameter. The $l_{TRS}$ is equal to the l or is a separately defined parameter. If the $N^{TRS}_{ID}$ is not separately prescribed, the $N^{TRS}_{ID}$ may be equal to the $N^{csi}_{ID}$).

The TRS may be transmitted through RBs (for example, 6 RB of a center band) of a specific frequency band. A transmitted band of the TRS may vary according to a time.

A TRS sub-frame to which the TRS is transmitted may be determined based on the TRS configuration. The TRS sub-frame may be prescribed independently from the CSI-RS sub-frame. The TRS sub-frame may be selected from sub-frames prescribed as the CSI-RS sub-frames. The TRS sub-frame may be prescribed so that only a CSI-RS with respect to one antenna port in RBs in a CDM form transmitted from two antenna ports.

When the TRS sub-frame and the CSI-RS sub-frame are repeated, the CSI-RS may not be transmitted. Alternatively, if an RE to which the TRS is transmitted and an RE to which the CSI-RS is transmitted are repeated, the CSI-RS may not be transmitted. In contrast, the CSI-RS may be transmitted but the TRS may not be transmitted.

The TRS sub-frame may preferentially include sub-frames (sub-frames 0 and/or 5) to which a PSS/SSS and/or a PBCH are transmitted. The wireless device tracks the synchronization in a limited time resource when performing the DRX or inter-frequency measurement using a measurement gap by prescribing the same sub-frame performing initial synchronization as a sub-frame performing the synchronization tracking through the TRS.

There is a case where the wireless device operates in only a limited sub-frame. For example, the wireless device prescribed by the DRX performs DL measurement and PDCCH monitoring only when the onDuration Timer is in an active state. Alternatively, the base station may prescribe measurement gap for inter-frequency measurement performing measurement with respect to a frequency band other than a serving frequency band used by a current serving cell.

Hereinafter, the TRS may be configured by the above CSI-RS or the CRS.

If the TRS sub-frame does not correspond to both of an on-duration and a measurement gap, a corresponding wireless device may not perform the synchronization tracking through the TRS.

The base station may prescribe a sub-frame corresponding to the on-duration or the measurement gap to include the TRS sub-frame. To this end, a DRX period or a period of the measurement gap may be prescribed to be a multiple of a TRS transmission period. A DRX period applicable to the NCT and the period of the measurement gap may be a multiple of the TRS transmission period.

The wireless device prescribed by the DRX may not measure the NCT. This is applicable to a case where a relationship between a transmission period of the TRS and the DRX period does not satisfy a specific condition. This is applicable to a case where the DRX period is not a multiple of the TRS transmission period. That is, only when the DRX period is the multiple of the TRS transmission period, the wireless device may perform the inter-frequency measurement at the NCT.

The wireless device may not perform the inter-frequency measurement with respect to the NCT. This is applicable to a case where the relationship between a transmission period of the TRS and the measurement gap does not satisfy a specific condition. This is applicable to a case where the measurement gap is not the multiple of the TRS transmission period. That is, only when the measurement gap is the multiple of the TRS transmission period, the wireless device may perform the inter-frequency measurement in the NCT.

The NCT may not be prescribed to the wireless device prescribed by the DRX. The wireless device performing the DRX may disregard the TRS configuration. The base station may not always prescribe the NCT to the wireless device prescribed by the DRX. This is applicable to a case where the transmission period of the TRS does not satisfy the specific condition.

The same DRX period or a measurement gap for the inter-frequency measurement is prescribed to all carriers set to one wireless device in the legacy carrier. However, in order to more efficiently performing frequency/time synchronization tracking and measurement in the NCT, the DRX period and/or the measurement gap for the NCT may be prescribed independently from a DRX period and the measurement gap set for the legacy carrier.

Figure 6:
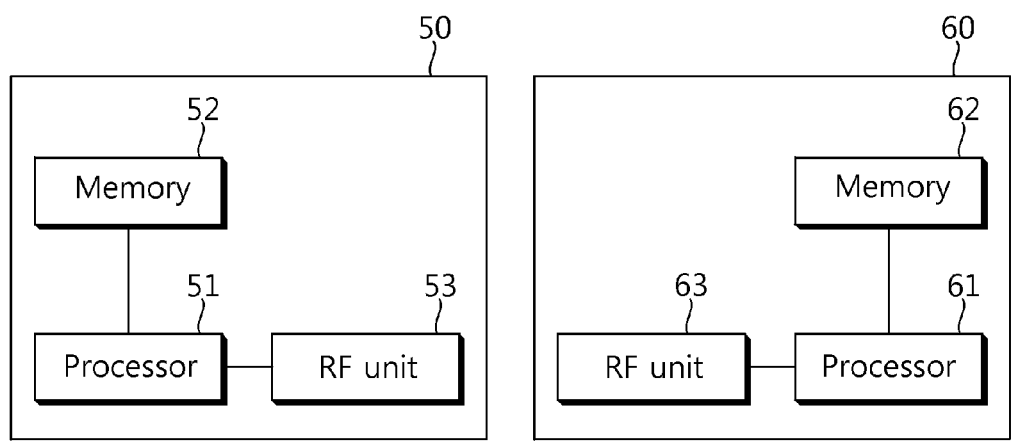
FIG. 6 is a block diagram illustrating a wireless communication system according to the embodiment of the present invention.

FIG. 6 is a block diagram illustrating a wireless communication system according to the embodiment of the present invention.

A BS 50 includes a processor 51, a memory 52 and an RF unit 53. The memory 52 is connected to the processor 51, and stores various information for driving the processor 51. The RF unit 53 is connected to the processor 51, and transmits and/or receives radio signals. The processor 51 implements proposed functions, processes and/or methods. In the above embodiment, an operation of the base station may be implemented by the processor 51. In the embodiment of FIG. 6, the operation of the BS 50 can be implemented by the processor 51.

A UE 60 includes a processor 61, a memory 62 and an RF unit 63. The memory 62 is connected to the processor 61, and stores various information for driving the processor 61. The RF unit 63 is connected to the processor 61, and transmits and/or receives radio signals. The processor 61 implements proposed functions, processes and/or methods. In the embodiment of FIG. 6, the operation of the narrowband terminal, the MTC device, and a terminal operating at a region with limited coverage can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of carrying out synchronization tracking in a wireless communication system, the method comprising:
   receiving channel status information-reference signal (CSI-RS) configuration for prescribing a CSI-RS from a base station by a wireless device;
   receiving tracking reference signal (TRS) configuration for prescribing a TRS from the base station by the wireless device;
   receiving the CSI-RS according to the CSI-RS configuration by the wireless device;
   receiving the TRS according to the TRS configuration by the wireless device; and
   tracking the synchronization based on the TRS by the wireless device,
   wherein the TRS configuration comprises information on whether an antenna port used according to the CSI-RS is used according to the TRS.

2. The method of claim 1,
   wherein the TRS configuration comprises information on whether the TRS is collaboratively used through a combination of the CRS-RS and the TRS.

3. The method of claim 1,
   wherein the CSI-RS and the TRS are received in a sub-frame including a first slot and a second slot.

4. The method of claim 3,
   wherein the CSI-RS is received in the first slot, and the TRS is received in the second slot.

5. The method of claim 3,
   wherein a cell specific reference signal (CRS) is not received in the sub-frame.

6. The method of claim 1,
   wherein the CSI-RS is received through a first pair among a plurality of antenna port pairs, and the TRS is received through one antenna port of a second pair among the plurality of antenna port pairs.

7. The method of claim 1, wherein the TRS configuration comprises information on a transmission period when the TRS is transmitted.

8. The method of claim 7,
wherein a discontinuous reception (DRX) period prescribed to the wireless device is a multiple of the transmission period.

9. A wireless device for carrying output synchronization tracking in a wireless communication system, the wireless device comprising:
a radio frequency (RF) unit configured to transmit and receive a wireless signal; and
a processor connected to the RF unit,
wherein the processor receives channel status information-reference signal (CSI-RS) configuration for prescribing the CSI-RS from a base station by a wireless device,
receives tracking reference signal (TRS) configuration for prescribing the TRS from the base station by the wireless device,
receives the CSI-RS according to the CSI-RS configuration by the wireless device,
receives the TRS according to the TRS configuration by the wireless device, and
tracks the synchronization based on the TRS by the wireless device,
wherein the TRS configuration comprises information on whether an antenna port used according to the CSI-RS is used according to the TRS.

10. The wireless device of claim 9, wherein the TRS configuration comprises information on whether the TRS is collaboratively used through a combination of the CRS-RS and the TRS.

11. The wireless device of claim 1, wherein the CSI-RS and the TRS are received in a sub-frame including a first slot and a second slot, the CSI-RS is received in the first slot, and the TRS is received in the second slot.

* * * * *